US005381008A

United States Patent [19]

Tanner et al.

[11] Patent Number: 5,381,008

[45] Date of Patent: Jan. 10, 1995

[54] METHOD OF PLASMA MASS ANALYSIS WITH REDUCED SPACE CHARGE EFFECTS

[75] Inventors: Scott D. Tanner, Aurora; Donald J. Douglas; Lisa Cousins, both of Toronto, all of Canada

[73] Assignee: MDS Health Group Ltd., Etobicoke, Canada

[21] Appl. No.: 59,393

[22] Filed: May 11, 1993

[51] Int. Cl.$^6$ ........................ B01D 59/44; H01J 49/00

[52] U.S. Cl. ........................ 250/288; 250/282

[58] Field of Search ........................ 250/281, 282, 288

[56] References Cited

U.S. PATENT DOCUMENTS

| | | | |
|---|---|---|---|
| 4,963,735 | 10/1990 | Okamoto et al. | 250/288 |
| 4,999,492 | 3/1991 | Nakagawa | 250/288 |
| 5,051,584 | 9/1991 | Gray et al. | 250/288 |
| 5,148,021 | 9/1992 | Okamoto et al. | 250/288 |

OTHER PUBLICATIONS

Chambers and Hieftje, paper entitled "Fundamental studies of the sampling process in an inductivity coupled plasma mass spectrometer-II. Ion kinetic energy measurements", published in *Spectrochemica Acta*, vol. 46B, No. 6/7, pp. 761–784, 1991.

Chambers, Ross and Hieftje, paper entitled "Fundamental studies of the sampling process in an inductively coupled plasma mass spectrometer-III. Monitoring the ion beam", published in *Spectrochemica Acta*, vol. 46B, No. 6/7, pp. 785–804, 1991.

Ross and Hieftje, paper entitled "Alteration of the ion-optic lens configuration to eliminate mass-dependent matrix-interference effects in inductively coupled plasma-mass spectrometry", published in *Spectrochemica Acta*, vol. 46B, No. 9, pp. 1263–1273, 1991.

Paper by Gillson et. al. entitled "Non-spectroscopic Interelement Interferences in Inductively Coupled Plasma Mass Spectrometry (ICP-MS)", published in *Analytical Chemistry*, vol. 60, No. 14, pp. 1472–1474, 1988.

Paper by Scott D. Tanner entitled "Space charge in ICP-MS: calculation and implications", published in *Spectrochemica Acta*, vol. 47B, No. 6, pp. 809–823, 1992.

Article by P. J. Turner entitled "Some Observations on Mass Bias Effects Occurring in ICP-MS Systems", published in the text *Application of Plasma Source Mass Spectrometry*, editors G. Holland and A. N. Eaton, published by The Royal Society of Chemistry, United Kingdom, 1991.

*Primary Examiner*—Bruce C. Anderson

*Attorney, Agent, or Firm*—Bereskin & Parr

[57] ABSTRACT

A method of analyzing an analyte contained in a plasma, in inductively coupled plasma mass spectrometry (ICP-MS). A sample of the plasma is drawn through an orifice in a sampler. The sample is then skimmed in a skimmer orifice, and the skimmed sample is directed at supersonic velocity onto a blunt reducer having a small orifice therein, forming a shock wave on the reducer. Gas in the shock wave is sampled through an offset aperture in the reducer into a vacuum chamber containing ion optics and a mass spectrometer. Because the gas sampled through the skimmer and reducer orifices is substantially neutral (ions and free electrons are in close proximity), and also because the reducer orifice is very small, space charge effects are reduced, thus reducing mass bias and also reducing the mass dependency of matrix effects. Separation of ions from free electrons and focusing of ions into the mass spectrometer largely occurs in and downstream of the ion optics in the vacuum chamber. Since the region between the skimmer and the reducer can operate at about 0.1 Torr, which is the same pressure as that produced by the roughing pump which backs the high vacuum pump for the vacuum chamber, a single common pump can be used for both purposes, thus reducing the hardware needed.

29 Claims, 8 Drawing Sheets

METHOD OF PLASMA MASS ANALYSIS WITH REDUCED SPACE CHARGE EFFECTS

FIELD OF THE INVENTION

This invention relates to plasma mass analysis with reduced space charge effects.

BACKGROUND OF THE INVENTION

It is common to analyze trace elements by injecting samples containing the trace elements into a plasma, and then sampling the plasma into a mass analyzer such as a mass spectrometer. Usually, but not necessarily, the plasma is created by a high frequency induction coil encircling a quartz tube which contains the plasma; hence, the process is usually called inductively coupled plasma mass spectrometry or ICP-MS. An example of ICP-MS apparatus is shown in U.S. Pat. No. Re. 33,386 reissued Oct. 16, 1990 and U.S. Pat. No. 4,746,794 issued May 24, 1988, both assigned to the assignee of the present application.

Although ICP-MS systems are widely used, they have for many years suffered and continue to suffer from the serious problems of non-uniform matrix effects, and mass bias. Matrix effects occur when the desired analyte signal is suppressed by the presence of a concomitant element at high concentration. The problem occurs when a large number of ions travel through a small skimmer orifice into the first vacuum chamber containing ion optics. The ions create a space charge existing primarily in the region between the skimmer tip and the ion optics and also in the ion optics. The space charge reduces the number of ions which travel through the ion optics. A sample to be analyzed will usually contain a number of other elements in addition to the analyte element (i.e. the analyte element is embedded in a matrix of other elements), and if such other elements (often called matrix elements) are present in high concentration, they can create an increased space charge in the region between the skimmer tip and the ion optics. This reduces the transmission of the analyte ions.

In addition, in a conventional sampling interface, the ions travel through the interface at the speed of the bulk gas flow through the interface, and since all the ions have substantially the same speed, their energy increases with their mass (to a first approximation). If a matrix or dominant element is present in large concentration and has a high mass, it will persist through the space charge region more efficiently than other elements because it has a higher ion energy, and will therefore become the major space charge creating species. This worsens the space charge effect and reduces the transmission of low mass (low energy) ions more than that of high mass (high energy) ions. This effect is described in a paper entitled "Non-Spectroscopic Inter Element Interferences in Inductively Coupled Plasma Mass Spectrometry (ICP-MS)", by G. R. Gillson, D. J. Douglas, J. E. Fulford, K. W. Halligan, and S. D. Tanner, Analytical Chemistry, volume 60, 1472 (1988), and in a paper entitled "Space Charge in ICP-MS: Calculation and Implications" by S. D. Tanner, Spectrochimica Acta, volume 47B, 809 (1992). Therefore the matrix suppression effect tends to be non-uniform, i.e. it varies with the mass of the dominant element and with the mass of the analyte element. The non-uniformity is undesirable since sensitivity is reduced for some masses, and since corrections for changes in sensitivity are mass dependent (i.e. different for each element). Further, since ion transmission is dependent on mass, there will be small but significant changes in measured isotope ratios, particularly for light isotopes.

Even without a dominant matrix element, the space charge tends to create a non-uniform mass response, in that high mass analytes are transmitted through the skimmer to the ion optics and through the ion optics more efficiently (because of their higher kinetic energy) than low mass analytes. This is called mass bias, and it is also undesirable, for the same reasons.

One way of dealing with the space charge problem, as disclosed by P. J. Turner in an article entitled "Some Observations on Mass Bias Effects in ICP-MS Systems", disclosed in "Application of Plasma Source Mass Spectrometry", editors G. Holland and A. N. Eaton, published by the Royal Society of Chemistry, United Kingdom, 1991, is to apply a high voltage to accelerate the ion beam emerging from the skimmer orifice, as close to the skimmer orifice as possible. Since space charge varies inversely with the velocity of the ions, if the ions can be accelerated, the resultant space charge will be reduced. The Turner system works well in reducing space charge effects. However it suffers from the disadvantages that it may create large energy spreads which can degrade the mass spectrometer resolution; the high voltage creates a greater likelihood of electrical discharges which can cause excessive continuum background noise; and (as do conventional ICP-MS systems) it requires large and expensive vacuum pumps.

It is therefore an object of the present invention to provide an improved method of plasma mass analysis, in which matrix effects are made more uniform and mass bias is reduced, effectively by reducing space charge effects.

BRIEF SUMMARY OF THE INVENTION

In one of its aspects the invention provides a method of analyzing an analyte contained in a plasma, said method comprising:

(a) drawing a sample of said plasma through an orifice in a sampler member, (b) drawing a portion of said sample through an orifice in a skimmer to form a sample portion, (c) directing said sample portion, at supersonic velocity, onto a substantially blunt reducer member to form on said reducer member a shock wave containing at least some of said sample portion, (d) drawing a part of said sample portion from said shock wave through an orifice in said reducer member and into a vacuum chamber, (e) directing ions in said part into a mass analyzer in said vacuum chamber, and analyzing said ions in said mass analyzer.

In another aspect the invention provides a method of analyzing an analyte contained in a plasma, said method comprising:

(a) drawing a sample of said plasma through an orifice in a sampler member, (b) drawing a portion of said sample through an orifice in a skimmer to form a sample portion, (c) directing said sample portion towards a reducer member having a reducer orifice therein, said reducer orifice being smaller than said orifice in said skimmer, (d) drawing a part of said sample portion through said reducer orifice and into a vacuum chamber, (e) directing ions in said part into a mass analyzer in said vacuum chamber, and analyzing said ions in said mass analyzer, (f) the distance between said orifice in said skimmer and said orifice in said reducer member being between 3.0 mm and 20 mm.

Further aspects of the invention will appear from the following description, taken together with the accompanying drawings.

DETAILED DESCRIPTION OF PREFERRED EMBODIMENTS

Figure 1:
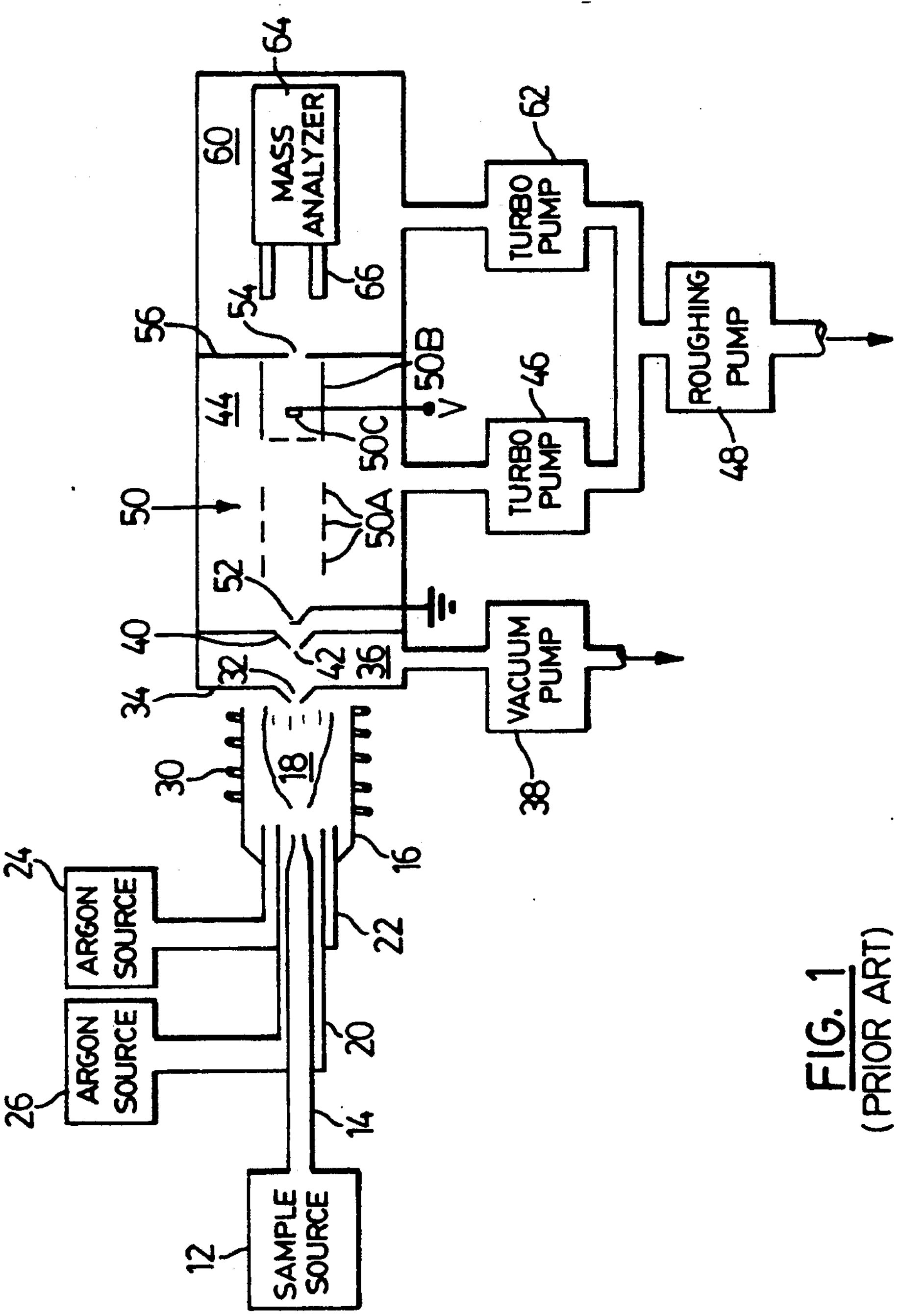
FIG. 1 (PRIOR ART)
FIG. 1 is a diagrammatic view of a prior art ICP-MS system.

Reference is first made to FIG. 1, which shows a conventional prior art ICP-MS system generally indicated by reference numeral 10. The system 10 is typically that sold under the trade mark "Elan" by Sciex Division of MDS Health Group Limited of Thornhill, Ontario, Canada (the assignee of the present invention) and is described in the above mentioned U.S. Pat. No. 4,746,794.

System 10 includes a sample source 12 which supplies a sample contained in a carrier gas (e.g. argon) through a tube 14 into a quartz tube 16 which contains a plasma 18. Two outer tubes 20, 22 concentric with tube 14 provide outer flows of argon, as is conventional. Tubes 20, 22 receive their argon from argon sources 24, 26 which direct argon into tubes 20, 22 in known manner.

The plasma 18 is generated at atmospheric pressure by an induction coil 30 encircling the quartz tube 16. Such torches are well known. Plasma 18 can of course also be generated using microwave or other suitable energy sources.

As is well known, the plasma 18 atomizes the sample stream and also ionizes the atoms so produced, creating a mixture of ions and free electrons. A portion of the plasma is sampled through an orifice 32 in a sampler 34 (protected by water cooling, not shown) which forms a wall of a first vacuum chamber 36. Vacuum chamber 36 is evacuated to a moderately low pressure, e.g. 1 to 5 Torr, by a vacuum pump 38.

At the other end of vacuum chamber 36 from sampler 34, there is located a skimmer 40 having an orifice 42 which opens into a second vacuum chamber 44. Vacuum chamber 44 is evacuated to a much lower pressure (e.g. $10^{-3}$ Torr or less) than is vacuum chamber 36, such evacuation being by a separate turbo vacuum pump 46, backed by a conventional mechanical roughing pump 48 (since turbo pumps normally must discharge into a partially evacuated region).

Vacuum chamber 44 contains ion optics generally indicated at 50 and typically being as described in U.S. Pat. No. 4,746,794. As there described, the ion optics 50 include a three element einzel lens 50A, followed by a Bessel box lens 50B, biased as ]referred to in said patent. Bessel box lens 50B contains a conventional center stop 50C. Vacuum chamber 44 also contains a shadow stop 52 as described in said patent, to block debris from the plasma from reaching the ion optics. Other forms of ion optics may also be used.

The ions emerging from the ion optics 50 travel through an orifice 54 in a wall 56 and into a third vacuum chamber 60. (Orifice 54 forms the rear Bessel box aperture.) Vacuum chamber 60 is evacuated by a second turbo pump 62 which is also backed by the roughing pump 48. (Diffusion or other suitable high speed vacuum pumps may be used instead of the turbo pumps 46, 62.) Vacuum chamber 60 contains a mass analyzer 64 which is typically a quadrupole mass spectrometer, but may be any other form of mass analyzer, e.g. an ion trap, or a magnetic sector analyzer. Short AC-only rods 66 (which have a variable RF voltage applied to them, but only a fixed DC bias) are used to focus ions into the mass spectrometer 64. The staged pumping in chambers 44, 60 and the two turbo pumps 46, 62 are used to avoid the need otherwise to use an exceptionally high speed vacuum pump, such as a cryopump.

In use, gas from the plasma 18 is sampled through sampler orifice 32 and expands in first vacuum chamber 36. A portion of such gas travels through skimmer orifice 42 into second vacuum chamber 44. The main purpose of the skimmer 40 is to reduce the gas load in vacuum chamber 44 to one that pump 46 can handle.

Ions from the plasma travel with the plasma gas through sampler orifice 32. Ions then pass through skimmer aperture 42, carried by the bulk gas flow. The ions are then charge separated, partly because of the low pressure in chamber 44 and partly because of the ion optics 50 and the bias potentials thereon. The ions are focused, by the ion optics 50, through orifice 54 and into the mass analyzer 64. The mass analyzer 64 is controlled in known manner to produce a mass spectrum for the sample being analyzed.

As discussed, the ion beam travelling through the region between the skimmer orifice 42 and the ion optics 50 is affected by the space charge formed after the ions travel through the orifice 42. The result is that while a relatively large ion current (typically about 1,500 microamperes) is calculated to pass through the skimmer orifice 42, only a very small ion current is transmitted to the ion optics 50. The measured current with a distilled water sample is about 6 microamperes. With a solution containing heavy elements at a high concentration, e.g. 9,500 micrograms per milliliter (ppm) uranium, the measured current increases to about 20 microamperes. The low transmission is caused in large part by space charge effects. Mathematical modelling indicates that the enhanced transmission of heavier ions further attenuates the transmission of lighter analyte ions, and this is consistent with the mass dependency of matrix effects observed in ICP-MS. Modelling shows that even in the absence of a matrix element, the space charge will attenuate the ion current of lower mass ions more than that of higher mass ions, giving rise to discrimination against low masses. The resultant non-uniform response leads to greater difficulty in calibrating the instrument and in detecting low mass ions.

In the past, workers have attempted to achieve higher sensitivity and more uniform response by accelerating the ion beam through the ion optics 50 by using a high voltage, or by using a larger skimmer orifice. Both these approaches have serious disadvantages, as mentioned. The high voltage approach may create large energy spreads which can degrade the resolution of the mass analyzer, and it increases the risk of electrical discharges which can increase background continuum noise. Making the skimmer orifice larger can increase the sensitivity but makes the space charge effects worse (because more ion current is transmitted), causing more severe matrix effects. A larger orifice also requires higher speed and more expensive pumps.

Therefore, the invention uses a completely different approach. According to the invention, instead of attempting to increase the ion current (in ways which produce new problems), the ion current transmitted to the ion optics is reduced. Although this is diametrically opposed to conventional techniques, the inventors have realized that the ion current transmitted into conventional ICP-MS instruments is reduced in any event, and that the reduction can be generated in a productive manner which will reduce the mass dependency of matrix effects, and which will also reduce low mass discrimination. Other benefits, e.g. reduced mass dependence of the energies of the ions transmitted into the ion optics, and reduced pumping requirements, can also be achieved, as will be described.

Figure 2:
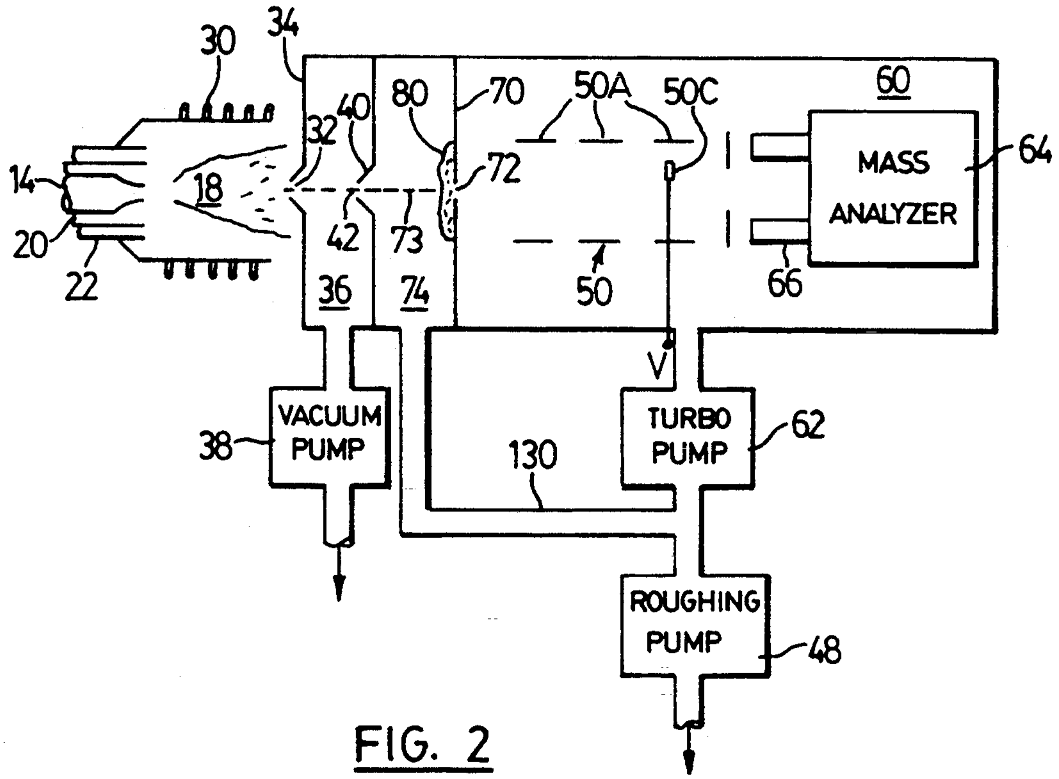
FIG. 2 is a view similar to that of FIG. 1 but showing an improved interface according to the invention.

As shown in FIG. 2, where corresponding reference numerals indicate parts corresponding to FIG. 1, the reduction in ion current is preferably achieved by employing a secondary skimmer or reducer 70 downstream of the skimmer 40. Reducer 70 contains a small orifice 72, preferably smaller in diameter than that of skimmer orifice 42 or sampler orifice 32. For example, while the sampler orifice 32 may typically be about 1.24 mm in diameter, and while the skimmer orifice 42 may typically range between about 0.5 and 1.2 mm in diameter, reducer orifice 72 is typically between 0.10 and 0.50 mm in diameter, and typically toward the smaller end of this range. Reducer 70 forms the downstream wall of an intermediate vacuum chamber 74, between vacuum chambers 36, 60. Vacuum chamber 44 has been removed and the ion optics 50 have been placed in vacuum chamber 60. Reducer orifice 72 is also offset from the common axis 73 of orifices 32, 42, e.g. by about 1.9 mm (center to center distance). Vacuum chamber 60 is still pumped by the turbo pump 62 and roughing pump 48, but chamber 74 is pumped only by roughing pump 48, as will be described.

In FIG. 2 the ion optics 50 have been modified slightly, by removing the Bessel box lens 50B and by moving its stop 50C into the last (most downstream) cylindrical lens element 50A of the einzel lens 50. However if desired the same ion optical arrangement as that shown in FIG. 1 may be used, or other ion optical arrangements may be used.

Preferably all three plates, namely sampler 34, skimmer 40 and reducer 70, are electrically grounded. Alternatively any or all of these plates, particularly the reducer 70, may be electrically biased relative to each other, but by a low voltage, e.g. 10 volts or less. When the voltage on all three plates 34, 40 and 70 is the same or differs only slightly (e.g. by not more than about 10 volts DC), then the plasma 18 tends to be extracted through their orifices as a substantially neutral plasma, i.e. free electrons and positive ions remain in relatively close proximity. Charge separation in chambers 36, 74 is in any event inhibited by the pressures therein, which pressures will now be described.

The pressures in vacuum chamber 36 (between sampler 34 and skimmer 40) and in vacuum chamber 74 (between skimmer 40 and reducer 70) are preferably arranged for a shock wave to form on reducer 70. The pressure in chamber 36 is typically about 2 to 5 Torr, while the pressure in chamber 74 is typically between 0.5 Torr and $10^{-3}$ Torr, preferably about 0.1 to 0.3 Torr. With these pressures, the plasma 18 (which is at atmospheric pressure) expands through orifice 32 to produce supersonic flow in chamber 36. A portion of the supersonic flow passes through orifice 42 and impinges on reducer plate 70, forming a shock wave 80 which spreads across the upstream surface of plate 70. In the shock wave 80, the directed velocity of the gas goes from supersonic (i.e. greater than the local speed of sound) to virtually zero in only one or a few mean free paths, typically in 0.5 mm or less. The kinetic energy of the gas is thus converted to thermal energy, and the temperature and pressure in shock wave 80 increase dramatically. For example the temperature in the shock wave increases to approximately 90% of the original plasma temperature.

Figure 3:
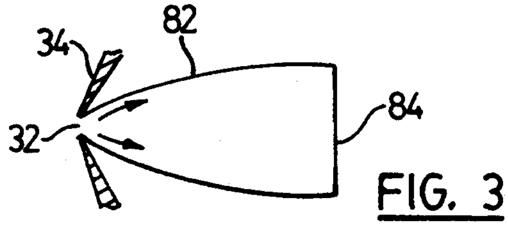
FIG. 3 is an enlarged view of a sampler used in ICP-MS systems.

As shown in more detail in FIG. 3, the gas from the plasma expands through sampling orifice 32 in a free jet 82. The free jet if undisturbed would normally terminate downstream of orifice 32 in a Mach disk 84. The distance between the Mach disk 84 and the orifice 32 is given by the known relation $$\frac{x_m}{D_0} = .67\sqrt{\frac{P_0}{P_1}}$$

where $x_m$ is the distance between orifice 32 and the Mach disk 84, $D_0$ is the diameter of orifice 32, and $P_0$ and $P_1$ are the pressures in the plasma and in the chamber 36 respectively. Preferably the skimmer tip should be upstream of the Mach disk 84, i.e. within distance $x_m$ of the aperture 32.

Figure 4:
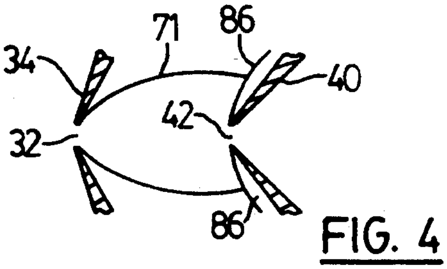
FIG. 4 is an enlarged view of a sampler and skimmer used in ICP-MS systems.

As shown in FIG. 4, no shock wave forms at the skimmer orifice 42; instead, the gas simply streams through such orifice. This is because the skimmer 40 is sharp tipped, i.e. it is a relatively sharp cone (typically the angle between its two exterior sides as viewed in cross-section is about 60 degrees), so that the gas impinging on it does not suddenly have its velocity reduced to zero. (A shock wave may however attach to the sides of the skimmer cone, as indicated at 86.) Then, when the gas flowing through skimmer aperture 42 impacts flat reducer plate 70, the shock wave 80 is formed.

Normally the skimmer orifice 42 will be placed very close to the sampler orifice 32, e.g. within 5 to 10 mm. The distance between the skimmer orifice 42 and the reducer orifice 72 can range between about 3 and 20 mm, although about 8 mm to 10 mm is preferred. However the optimum reducer position may vary depending upon the diameter of the sampler, skimmer and reducer orifices and the downstream distance of the skimmer from the sampler.

Figure 4A:
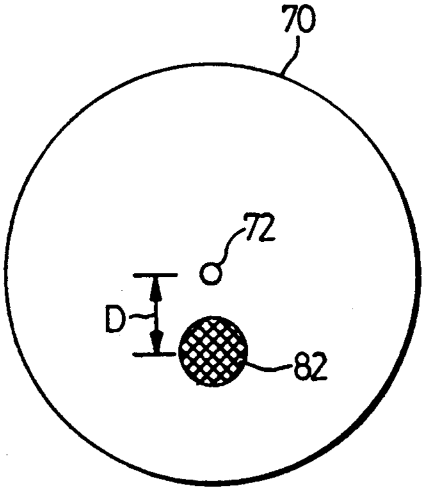
FIG. 4A is a plan view of a reducer plate showing deposit of material thereon.

Because the gas in shock wave 80 is at relatively high pressure (e.g. 2 to 4 Torr) and numerous collisions occur in the shock wave, all of the ions in the shock wave 80 acquire approximately the same (thermal) energy. Because the shock wave 80 spreads across plate 70, it can then be sampled through offset reducer orifice 72. The offsetting of orifice 72 does not cause any significant loss of ion signal as compared with having orifice 72 aligned with orifices 32, 42, because of the presence of shock wave 80. However the offsetting of orifice 72 ensures that photons travelling through orifices 32, 42 are largely blocked from entering vacuum chamber 60 and causing continuum background signal. In addition, contaminant materials from the plasma which may otherwise tend to plug the small orifice 72 impact harmlessly on the plate 70 beside orifice 72. Refractory materials such as aluminum oxide, which can tend to clog very small orifices, and which are extremely difficult to clean, can thus accumulate on plate 70 without interfering with transmission through orifice 72. This effect is shown in FIG. 4A, in which the deposit of material from the plasma through orifices 32, 42 onto plate 70 is shown at 82. Distance D is, as mentioned, typically 1.9 mm.

Figure 5:
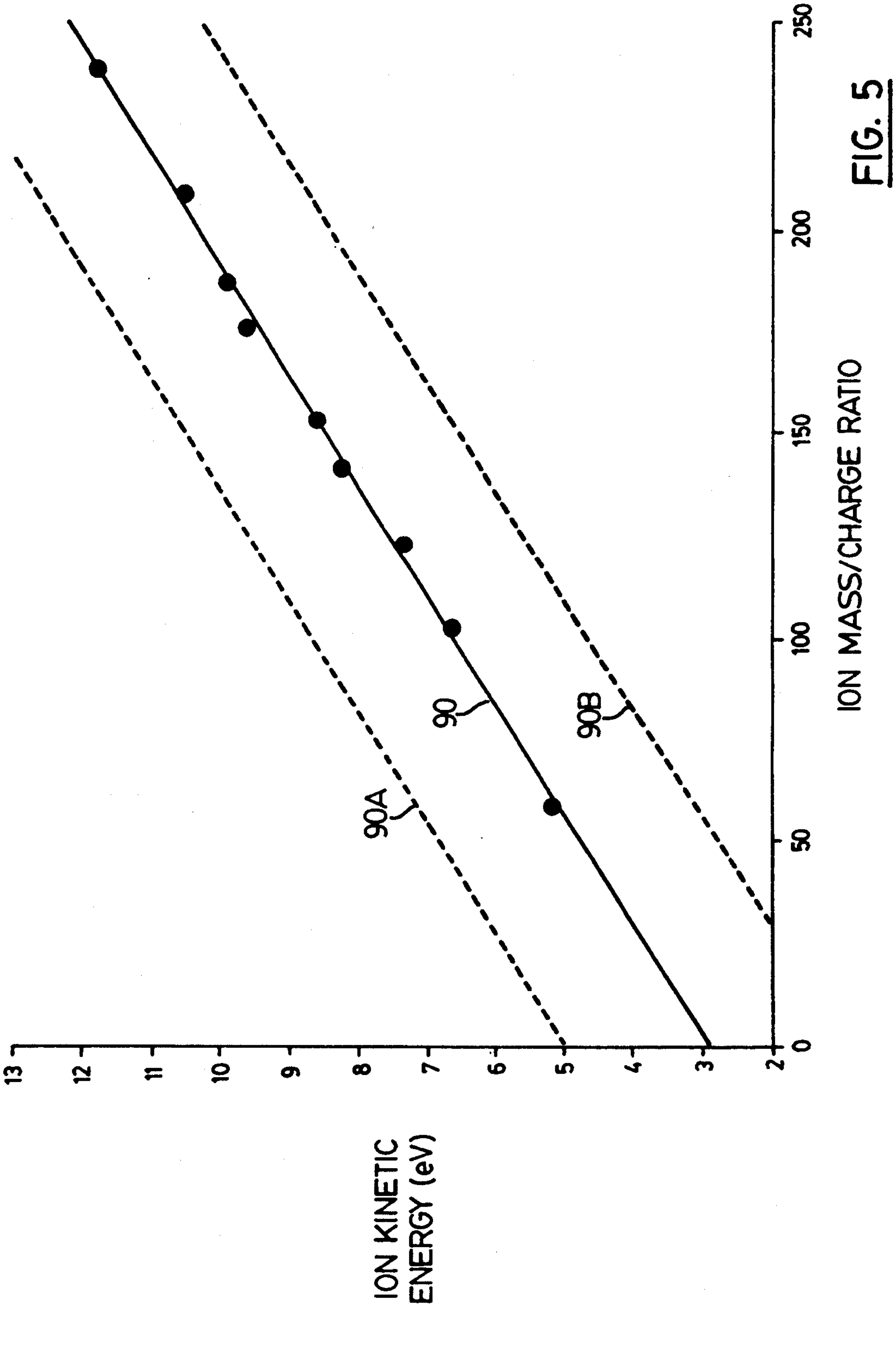
FIG. 5 is a graph showing ion kinetic energy in electron volts versus ion mass to charge ratio for the prior art instrument of FIG. 1.
Figure 6:
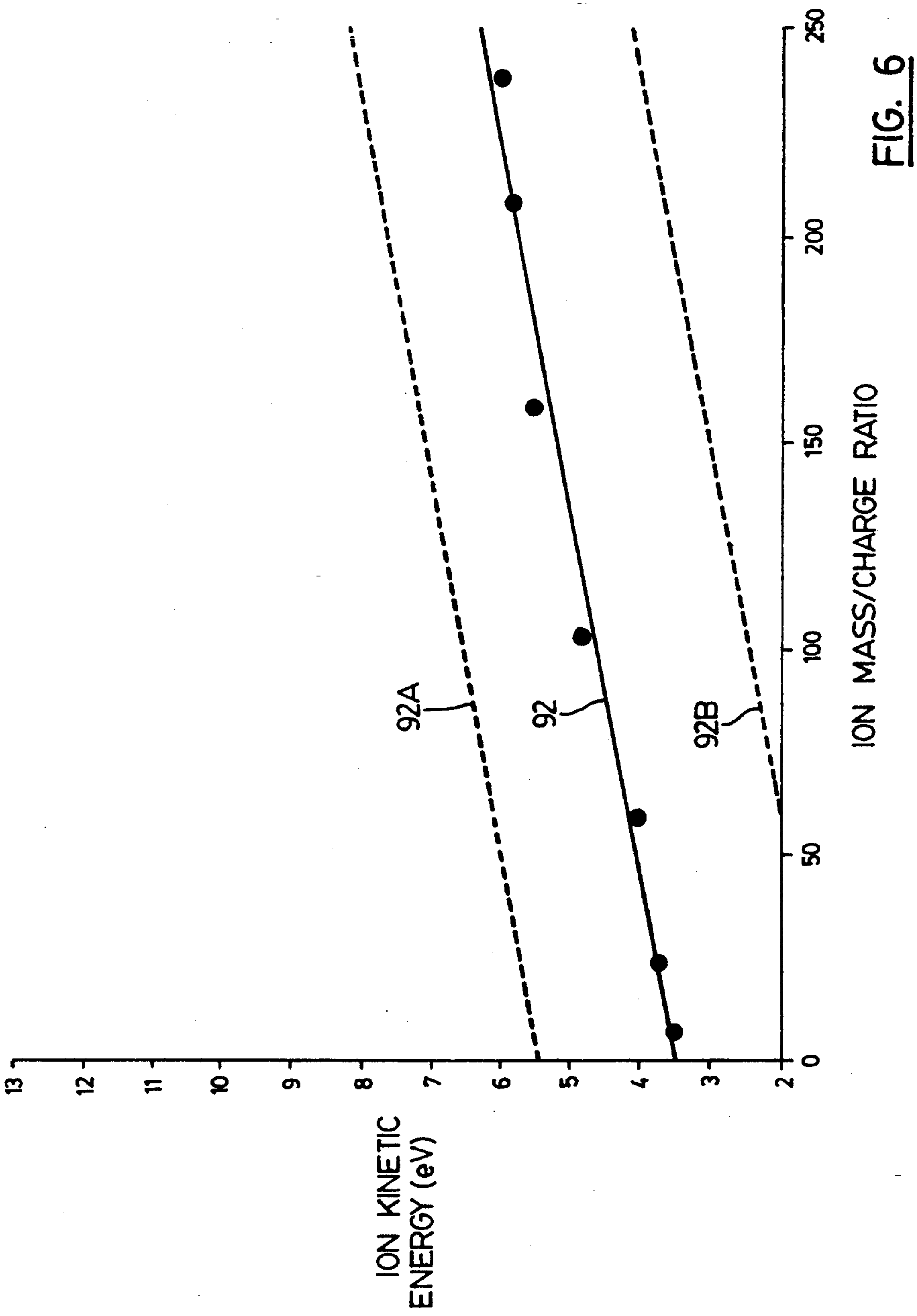
FIG. 6 is a graph showing ion kinetic energy in electron volts versus ion mass to charge ratio for the system of FIG. 2.

Because of the reduced density of the shock wave (as compared with the original plasma 18) and because of the small diameter of the reducer orifice 72, ions expanding through the reducer orifice have, downstream of the reducer orifice, very few collisions (e.g. of the order of about 1 to 10 collisions each instead of 100 to 200 collisions downstream of the skimmer orifice 42). Under these conditions the expansion into the ion optics 50 is nearly effusive, rather than being characterized by pure continuum flow. (In continuum flow, which for example characterizes the flow through skimmer orifice 42, all the ions expand with the same velocity, usually the bulk velocity of the gas which carries them.). Since the flow through the reducer is largely effusive, the mass dependence of the ions downstream of the reducer orifice 72 is reduced as compared with a standard system. The reduction in mass dependence of the ion energies is illustrated in FIGS. 5 and 6, which plot ion mass to charge ratio on the horizontal axis and ion kinetic energy in electron volts on the vertical axis. FIG. 5 is a plot made using the standard "Elan" (trade mark) prior art instrument illustrated in FIG. 1, while FIG. 6 was made using an instrument of the form shown in FIG. 2.

In FIG. 5, curve 90 illustrates the most probable relationship of ion kinetic energy to ion mass/charge ratio. Since there is in fact an approximately Gaussian distribution of ion energies about curve 90, curves 90A and 90B represent the normal half height (on the distribution curve) limits of the ion energy distribution, typically about 4 electron volts wide and thus ranging about 2.0 electron volts above and below curve 90. The slope of curve 90 represents the mass dependence of the ion energies, and the vertical distance between curves 90A, 90B represents the half height energy distribution at each mass. It will be seen from FIG. 5 that the most probable ion energies (curve 90) range from about 3 electron volts at very low mass to charge ratios, to about 12 electron volts at a mass to charge ratio of 238 (uranium).

In FIG. 6 curve 92 represents the most probable relationship of ion kinetic energy to ion mass/charge ratio, while curves 92A, 92B again represent the upper and lower half height limits of the ion energy distribution. It will be seen that the difference in the ion energies between the lower and upper ends of the mass range was much smaller than in FIG. 5. As a result of the low mass dependence of the ion energies, the ion energy distribution at mass/charge ratio 238 (between about 4.1 and 8.1 eV) overlaps the ion energy distribution (1.5 to 5.5 eV) at the lower end of the mass scale. Since the focusing characteristics of ions in the ion optics 50 commonly vary with ion energy (many ion optic systems are sensitive even to a difference as small as a few electron volts), it is found that when the reducer plate 70 is used, ions in the ion optics 50 can be focused more uniformly.

Figure 7:
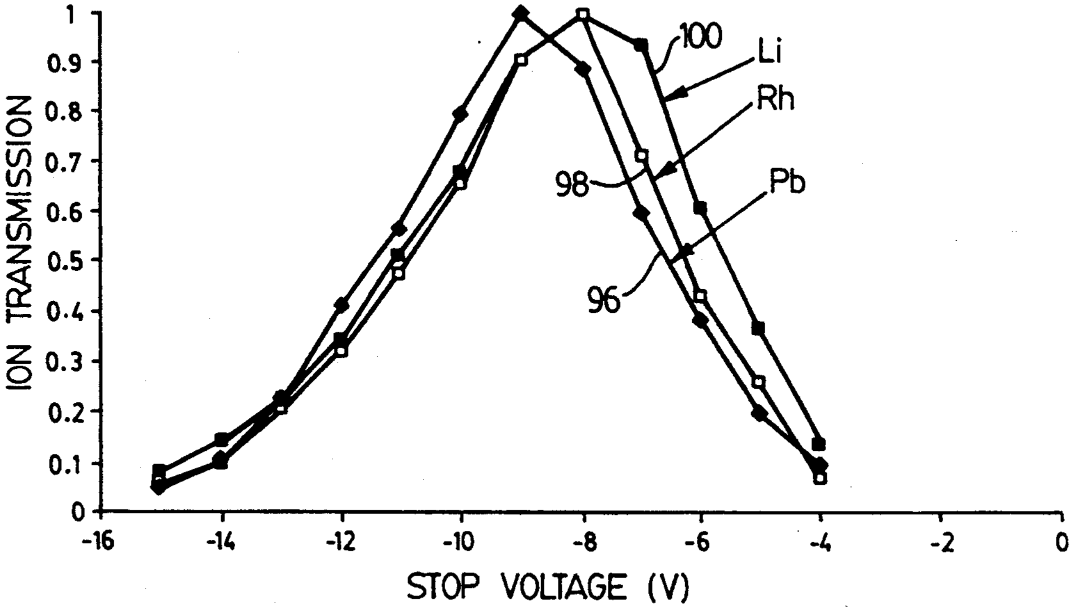
FIG. 7 is a graph showing mass dependence of the optimization of the stop voltage for the FIG. 2 instrument.

Because the ion energies are more uniform, and because therefore the ion transmissions for most elements optimize at approximately the same voltage settings in the ion optics, several benefits result. Firstly, it is easier to set up the system for operation, i.e. one setting of the voltages on the ion lenses remains optimum for all or most elements. For example if the instrument is adjusted for maximum response at mass to charge ratio 103, the operator will know that the response will also be approximately optimum for other elements. This is best shown in FIG. 7, which plots on the vertical axis ion transmission for three different elements, versus (on the horizontal axis) the voltage on the center stop 50C of the ion lens 50 (this is one of the voltages which must be adjusted on the version shown for the ion optics). In FIG. 7 curve 96 is for the element lead, curve 98 is for the element rhodium, and curve 100 is for the element lithium. It will be seen that all three curves are approximately optimum for a stop voltage of about −8 volts. This may be contrasted with the situation shown in FIG. 5 of U.S. Pat. No. 4,746,794, where the ion transmissions for different elements each optimized at a substantially different voltage.

It is found that the ion current transmitted through reducer orifice 72 into the ion optics 50 in the FIG. 2 arrangement is far less than the ion current transmitted through the skimmer orifice 42 into the ion optics 50 in the FIG. 1 arrangement. For example, while in the FIG. 1 arrangement the ion current transmitted to the ion optics may range from about 6 to 20 microamperes, the ion current downstream of the reducer orifice 72 in the FIG. 2 arrangement is measured as being only about 10 to 100 nanoamperes, or roughly 200 to 600 times smaller. Nevertheless, the FIG. 2 instrument had sensitivity as high as or higher than that of the FIG. 1 instrument, as will be described. This result indicates that most of the current transmitted through skimmer orifice 42 in the FIG. 1 instrument was being lost in the space charge region.

Because the ion current transmitted through reducer orifice 72 in the FIG. 2 instrument is so small, space charge effects are greatly reduced. This reduces both mass bias and non-uniform matrix effects. Mass bias is further reduced since ions travelling through reducer orifice 72 have reduced variation of energy with mass (as shown in FIG. 6).

Figure 8:
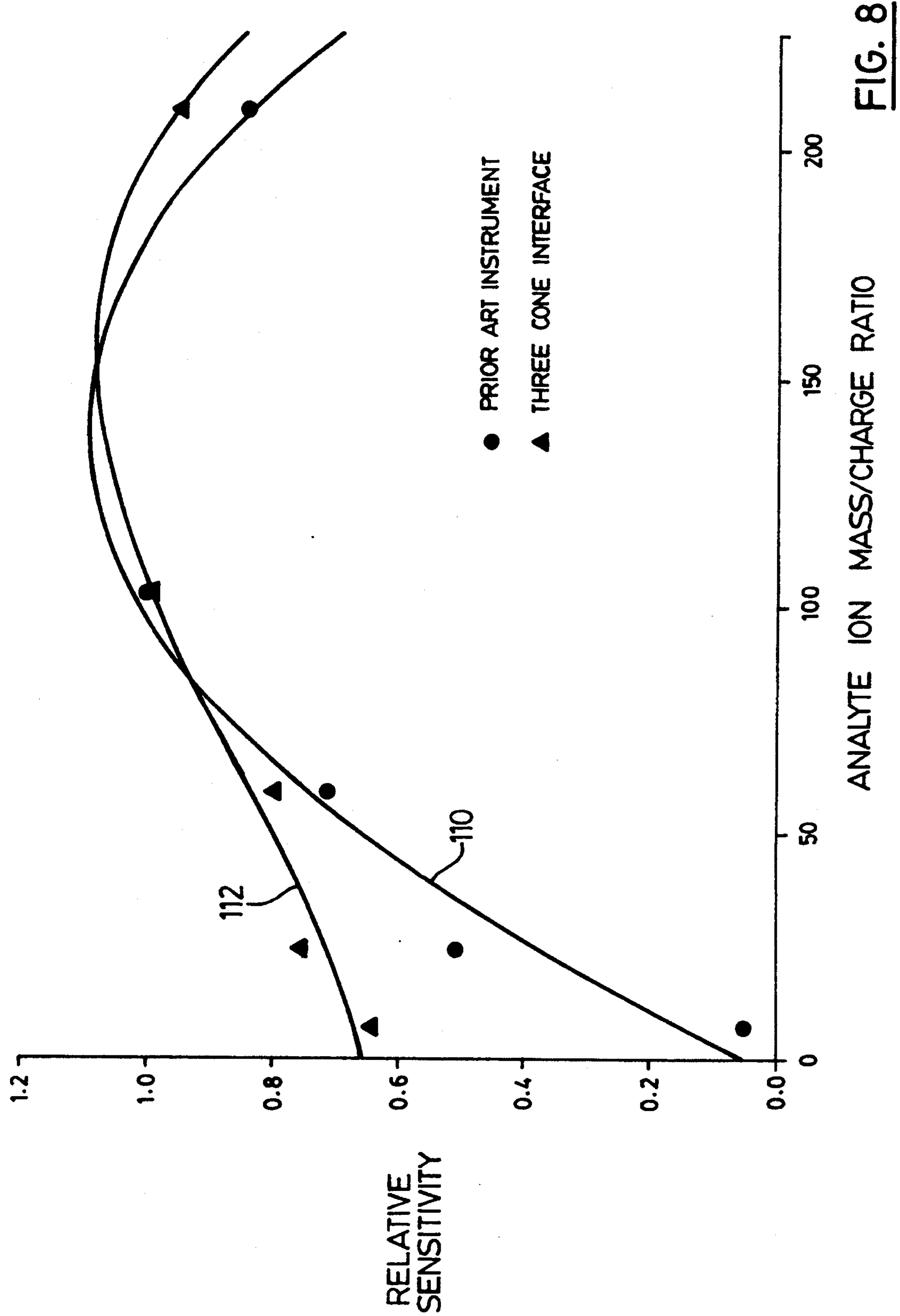
FIG. 8 is a graph showing relative sensitivity versus analyte ion mass to charge ratio, for a prior art instrument and for an embodiment of the invention.

An example of the reduction in the mass bias produced by the FIG. 2 instrument is shown in FIG. 8, where relative sensitivity is plotted on the vertical axis, against analyte ion mass to charge ratio on the horizontal axis. No matrix elements were present. Relative sensitivity is defined as the sensitivity of the instrument to one element divided by the sensitivity to another element. To produce FIG. 8, the following elements were used: lithium (mass/charge ratio=7), magnesium (mass/charge ratio=24), cobalt (mass/charge ratio=59), rhodium (mass/charge ratio=103), and lead (mass/charge ratio=208). The sensitivities for the elements plotted were normalized to the sensitivity for rhodium, and thus the relative sensitivity for rhodium was 1.0. (The above numbers are corrected for isotopic abundance.).

Curve 110 in FIG. 8 is a mass bias response curve for a standard FIG. 1 "Elan" (trade mark) instrument. It will be seen from curve 110 (which is typical of presently available instruments) that the relative sensitivity varies greatly with analyte mass, particularly at low masses. The "Elan" (trade mark) instrument had a standard sampler and skimmer, as shown in FIG. 1.

Curve 112 in FIG. 8 is a mass bias response curve using an ICP-MS instrument of the FIG. 2 design. The reducer orifice 72 was 0.2 mm in diameter and was 15 mm from the sampler orifice 34; the skimmer orifice 42 was 5 mm from the sampler orifice 34 (i.e. the reducer orifice was 10 mm from the skimmer orifice), and the voltages on the sampler, skimmer and reducer were all 0 volts (all were grounded). The sampler and skimmer orifices 32, 42 were 1.1 mm and 0.8 mm in diameter respectively, and the pressures in chambers 36, 64 and 60 were 4 Torr, 0.2 Torr and $2\times10^{-5}$ Torr respectively. While curve 112 still varies with mass, its mass dependency is much reduced. For example at low mass, e.g. at the first measurement point (lithium), the relative sensitivity is increased by more than ten times.

While FIG. 8 shows only relative sensitivity, in fact absolute sensitivity of the order of about 3 million to 10 million counts per second per ppm has been achieved with the FIG. 2 instrument at mass/charge 103 (rhodium), depending on orifice sizes used. This compares with a sensitivity of about 5 million counts per second per ppm for rhodium for a standard "Elan" (trade mark) instrument as shown in FIG. 1, and of course for the FIG. 2 instrument the sensitivity varied much less with mass. In addition, only one high speed vacuum pump is needed instead of two.

Figure 9:
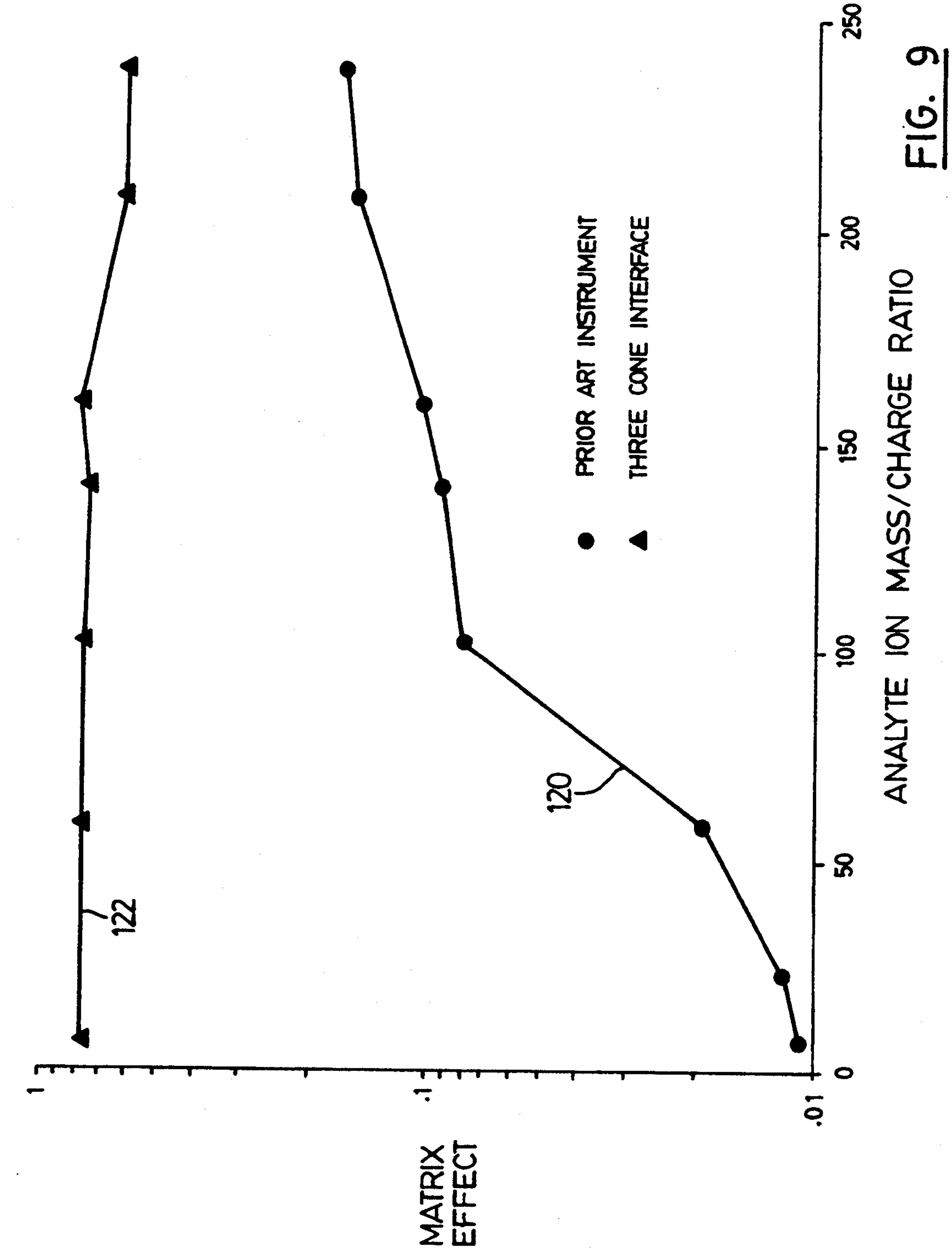
FIG. 9 is a graph showing matrix effect versus analyte ion mass to charge ratio, for a prior art instrument and for an embodiment of the invention.

Reference is next made to FIG. 9, which compares the matrix effects in a standard "Elan" (trade mark) instrument, and in an instrument using the invention. In FIG. 9 matrix effect is plotted on the vertical axis and analyte mass to charge ratio on the horizontal axis. Matrix effect is defined (for purposes of testing) as:

$$\text{matrix effect} = \frac{\text{(sensitivity to the analyte in 1000 ppm thallium solution)}}{\text{(sensitivity to the analyte in 2.5\% nitric acid/distilled de-ionized water solution)}}$$

the denominator representing a clean solution. It will be appreciated that the analyte concentration is typically of the order of 0.01 ppm, i.e. much less than that of the thallium.

In FIG. 9 the matrix effect as defined above using a standard "Elan" (trade mark) instrument is shown at curve 120, and the matrix effect as defined above using a reducer according to the invention is shown at curve 122. It will be seen that for a standard "Elan" (trade mark) instrument, the matrix effect (curve 120) varies substantially with analyte mass. With the method of the invention, the matrix effect is reduced, i.e. curve 122 is closer to a value of 1.0 (at which value the matrix effect disappears). In addition curve 122 is more independent of analyte mass. Thus, the use of the invention reduces both mass bias, and mass dependence of matrix effects.

As indicated, the FIG. 2 arrangement also achieves economies in vacuum pumping. Preferably chamber 74 is pumped to between 0.1 and 0.3 Torr. Ion transmission is high at this pressure, and because of the relatively high pressure, the neutrality of the flow through chamber 74 is ensured.

Since roughing pump 48 conveniently provides a region at 0.1 to 0.3 Torr, chamber 74 can be connected by duct 130 (FIG. 2) to roughing pump 48, thereby eliminating the need for a separate pump for chamber 74. In addition, because reducer 70 limits the flow of gas into high vacuum chamber 60, the capacity of turbo pump 62 can be small, e.g. about 50 liters/second with a 0.2 mm diameter reducer orifice 72.

Figure 10:
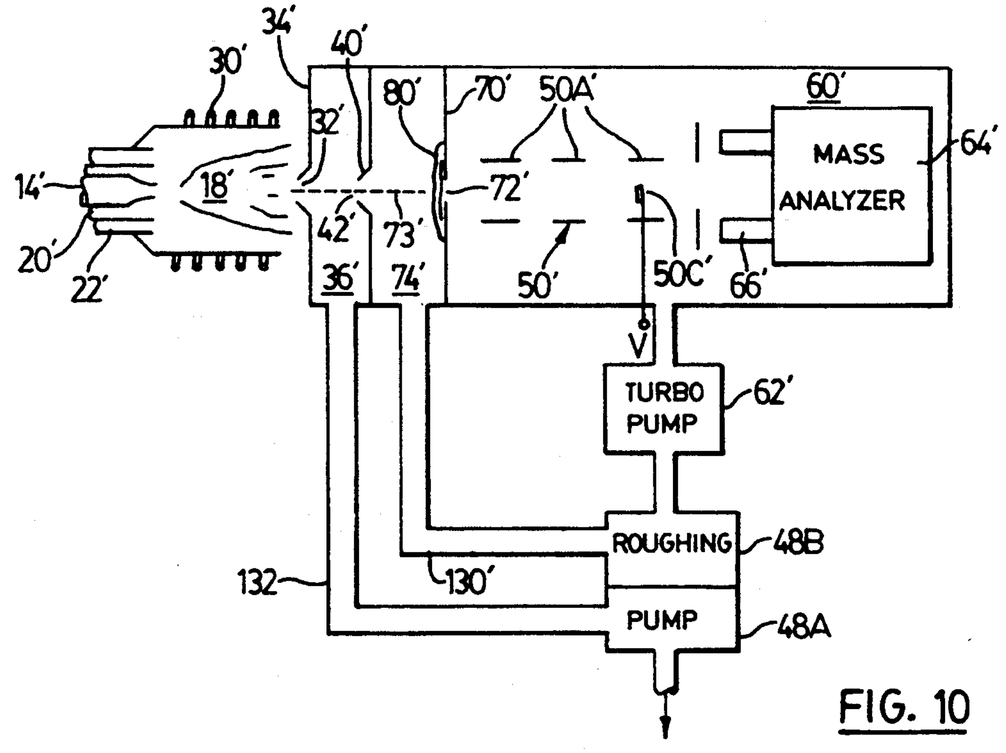
FIG. 10 is a diagrammatic view similar to that of FIG. 2 but showing a modified embodiment of the invention.

In addition, since roughing pump 48 can be a two stage pump (having as shown in FIG. 10 a first stage 48A which pumps down to 5 Torr and a second stage 48B which pumps down to 0.1 Torr), the first vacuum chamber 36′ can be evacuated by a duct 132 connected to stage 48A, with duct 130′ connected to stage 48B, as shown in FIG. 10 where primed reference numerals indicate parts corresponding to those of FIG. 2. This further reduces the hardware requirements.

Figure 11:
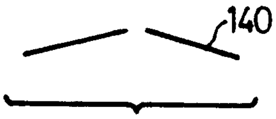
FIG. 11 shows a modified reducer plate according to the invention.
Figure 12:
FIG. 12 shows a further modified reducer plate according to the invention.

Although the reducer plate 70 has been shown as flat, it can if desired be a blunt cone as shown at 140 in FIG. 11, or can be a large diameter curved surface as shown at 142 in FIG. 12, so long as a shock wave forms over its surface. Because the shock wave spreads across the surface of the reducer, the ions can be sampled through a reducer orifice which is offset from the common axis 73 through the sampler and skimmer orifices.

Figure 13:
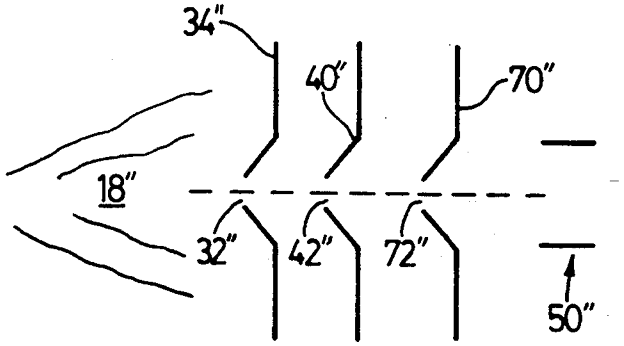
FIG. 13 shows a further modified arrangement of sampler, skimmer and reducer plates according to the invention.

Alternatively, and as shown in FIG. 13 where double primed reference numerals indicate parts corresponding to those of FIGS. 1 and 2, the reducer plate 70″ can be sharp tipped, like the skimmer 40″ but with a smaller aperture. In this case, no shock wave will form at orifice 72″, and therefore the three orifices 32″, 42″ and 72″ must all be aligned on a con, non axis 146 since otherwise no ions will pass through reducer orifice 72″. This arrangement also has the advantage of reducing pumping requirements and permitting the same pump to be used both as roughing pump for chamber 60′, and to evacuate chamber 74′. However it suffers from the disadvantage that the very small reducer orifice 72″ is now exposed to a beam of matter from the plasma and tends to clog quickly. There-fore the FIG. 13 arrangement is not preferred.

Figure 14:
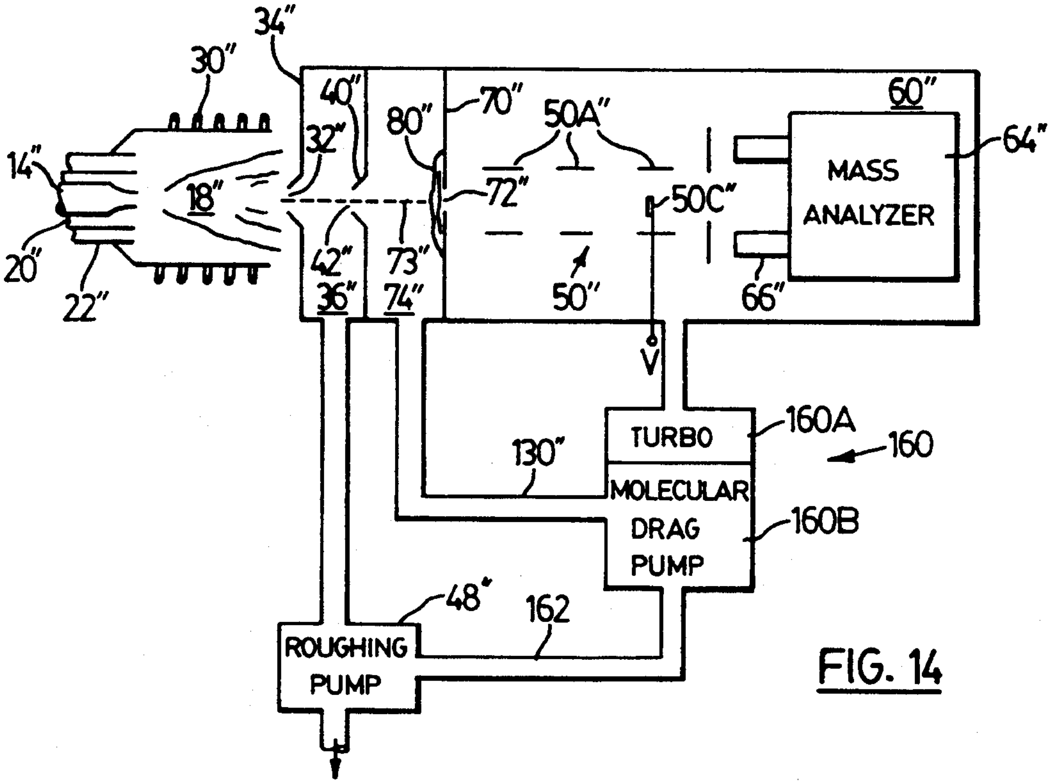
FIG. 14 is a diagrammatic view similar to those of FIGS. 2 and 10 but showing another modification of the invention.

Finally, reference is made to FIG. 14, which shows a further modified version of the invention and in which double primed reference numerals indicate parts corresponding to those of FIGS. 2 and 10. FIG. 14 illustrates the use of a high speed vacuum pump 160 which includes a turbo pump portion 160A discharging into a molecular drag pump portion 160B (such pumps are currently widely commercially available). The molecular drag pump portion 160B provides a 0.1 Torr region into which the turbo pump portion 160A may discharge, and can itself discharge into a higher pressure region of about 5.0 Torr. Therefore, chamber 60" is evacuated by pump 160, while chamber 74" (which is at about 0.1 Torr) is pumped through duct 130" by the molecular drag pump portion 160B. The molecular drag pump portion 160B, which must discharge into a 5.0 Torr region, is connected via duct 162 to roughing pump 48". Roughing pump 48" also evacuates chamber 36", since that chamber conveniently must also be evacuated to about 5.0 Torr. It will be seen that again, only one high speed vacuum pump (evacuating to $10^{-5}$ to $10^{-6}$ Torr) is needed, together with one roughing pump.

While several embodiments of the invention have been described, it will be appreciated that various changes can be made within the scope and spirit of the invention.

We claim:

1. A method of analyzing an analyte contained in a plasma, said method comprising:

(a) drawing a sample of said plasma through an orifice in a sampler member, (b) drawing a portion of said sample through an orifice in a skinner to form a sample portion, (c) directing said sample portion, at supersonic velocity, onto a substantially blunt reducer member to form on said reducer member a shock wave containing at least some of said sample portion, (d) drawing a part of said sample portion from said shock wave through an orifice in said reducer member and into a vacuum chamber, (e) directing ions in said part into a mass analyzer in said vacuum chamber, and analyzing said ions in said mass analyzer.

2. A method according to claim 1 wherein said orifices in said sampler member and skimmer are aligned on a common axis and said orifice in said reducer member is offset from said axis.

3. A method according to claim 2 wherein said sample passing through said orifice in said sampler member is substantially neutral.

4. A method according to claim 3 wherein said sample portion passing through said orifice in said skimmer is substantially neutral.

5. A method according to claim 4 wherein said part travelling through said orifice in said reducer men,her is substantially neutral.

6. A method according to claim 5 wherein the voltage difference between said sampler member and said skimmer does not exceed about 10 volts DC.

7. A method according to claim 6 wherein the voltage difference between said sampler member and said reducer member does not exceed about 10 volts DC.

8. A method according to claim 7 wherein said part of said sample passing through said orifice in said reducer member comprises positive ions and free electrons, and wherein said positive ions are separated from said electrons at least to a substantial extent in said focusing step.

9. A method according to claim 2 wherein the pressure in the region between said skimmer and said reducer member is between $10^{-3}$ Torr and 0.5 Torr.

10. A method according to claim 9 wherein said pressure is between 0.1 Torr and 0.3 Torr.

11. A method according to claim 10 and including the step of using a common pump to assist in evacuating said vacuum chamber, and also to evacuate one of the region between said skimmer and said reducer member, and the region between said skimmer and said sampler member.

12. A method according to claim 11 and including the step of using a first vacuum pump to evacuate said vacuum chamber, and discharging gas from said first vacuum pump into a roughing pump, said roughing pump being said common pump.

13. A method according to claim 1, 2 or 7 wherein said orifice in said reducer member is smaller than said orifice in said skimmer.

14. A method according to claim 1, 2 or 7 wherein the distance between said orifice in said reducer member and said orifice in said skimmer member is between 3.0 mm and 20 mm.

15. A method according to claim 1, 2 or 7 wherein the distance between said orifice in said reducer member and said orifice in said skimmer member is between 8.0 mm and 10 mm.

16. A method of analyzing an analyte contained in a plasma, said method comprising:

(a) drawing a sample of said plasma through an orifice in a sampler member, (b) drawing a portion of said sample through an orifice in a skimmer to form a sample portion, (c) directing said sample portion towards a reducer member having a reducer orifice therein, said reducer orifice being smaller than said orifice in said skimmer, (d) drawing a part of said sample portion through said reducer orifice and into a vacuum chamber, (e) directing ions in said part into a mass analyzer in said vacuum chamber, and analyzing said ions in said mass analyzer, (f) the distance between said orifice in said skimmer and said orifice in said reducer member being between 3.0 mm and 20 mm, (g) and using a common pump to assist in evacuating said vacuum chamber, and to evacuate one of the region between said skimmer and said reducer member, and the region between said sampler member and said skimmer.

17. A method according to claim 16 wherein said distance is between 8.0 mm and 10 mm.

18. A method of analyzing an analyte contained in a plasma, said method comprising:

(a) drawing a sample of said plasma through an orifice in a sampler member, (b) drawing a portion of said sample through an orifice in a skimmer to form a sample portion, (c) directing said sample portion towards a reducer member having a reducer orifice therein, said reducer orifice being smaller than said orifice in said skimmer, (d) drawing a part of said sample portion through said reducer orifice and into a vacuum chamber, (e) directing ions in said part into a mass analyzer in said vacuum chamber, and analyzing said ions in said mass analyzer, (f) and using a common pump to assist in evacuating said vacuum chamber, and to evacuate one of the region between said skimmer and said reducer member, and the region between said sampler member and said skimmer.

19. A method according to claim 16, 17 or 18 wherein the pressure in the region between said skimmer and said reducer member is between $10^{-3}$ Torr and 0.5 Torr.

20. A method according to claim 16, 17 or 18 wherein the pressure in the region between said skimmer and said reducer member is between 0.1 and 0.3 Torr.

21. A method according to claim 16, 17 or 18 wherein the voltage difference between said sampler member and said skimmer does not exceed about 10 volts DC.

22. A method according to claim 16, 17 or 18 wherein the voltage difference between said sampler member and said reducer member does not exceed about 10 volts DC.

23. Apparatus for analyzing an analyte contained in a plasma, said apparatus comprising:

(a) a sampler member having a sampler orifice therein for sampling said plasma, (b) a skimmer spaced from said sampler member and having a skimmer orifice therein, said skimmer orifice being aligned on a common axis with said sampler orifice to receive a portion of matter sampled through said sampler orifice, said sampler member and said skimmer respectively defining portions of opposing walls of a first vacuum chamber, (c) a reducer member spaced from said skimmer and having a reducer orifice therein, said reducer orifice being offset from said axis and being located between 3.0 and 20 mm from said skimmer orifice, said skimmer and said reducer member respectively defining portions of opposing walls of a second vacuum chamber, (d) third vacuum chamber means having an inlet wall, said reducer member forming a portion of said inlet wall, said third vacuum chamber means including means therein for directing, for analysis, ions from said plasma passing through said orifices, (e) said reducer member being substantially blunt adjacent said reducer orifice for a shock wave to form on said reducer member adjacent said reducer orifice.

24. Apparatus according to claim 23 and including first vacuum pump means connected to said third vacuum chamber for evacuating said third vacuum chamber, and roughing pump means connected to said first vacuum pump means for receiving exhaust from said first vacuum pump means, said roughing pump being coupled to one of said first and second vacuum chambers for evacuating the same.

25. Apparatus according to claim 24 wherein said roughing pump means is coupled to said second vacuum chamber for evacuating said second vacuum chamber.

26. Apparatus according to claim 24 wherein said roughing pump means is also coupled to said first vacuum chamber for evacuating said first vacuum chamber.

27. Apparatus according to claim 24 wherein said roughing pump means is coupled to said first vacuum chamber for evacuating said first vacuum chamber.

28. A method of analyzing an analyte contained in a plasma, said method comprising:

(a) drawing a sample of said plasma through an orifice in a sampler member, (b) drawing a portion of said sample through an orifice in a skimmer to form a sample portion, (c) directing said sample portion towards a reducer member having a reducer orifice therein, said reducer orifice being smaller than said orifice in said skimmer, (d) drawing a part of said sample portion through said reducer orifice and into a vacuum chamber, (e) directing ions in said part into a mass analyzer in said vacuum chamber, and analyzing said ions in said mass analyzer, (f) the distance be%ween said orifice in said skimmer and said orifice in said reducer member being between 3.0 mm and 20 mm, (g) and maintaining the voltage on each of said sampler member, said skimmer and said reducer member at a value which differs by not more than about 10 volts DC from the voltages on the others of said sampler member, said skimmer and said reducer member, so that plasma is extracted through the orifices therein as a substantially neutral plasma.

29. A method according to claim 28 wherein said sampler member, said skimmer and said reducer member are all grounded.

* * * * *